United States Patent Office 3,342,788
Patented Sept. 19, 1967

3,342,788
ADDITIVES
Manfred Brod, Wantage, England, assignor to Esso Research and Engineering Company, a corporation of Delaware
No Drawing. Filed Aug. 1, 1962, Ser. No. 213,886
Claims priority, application Great Britain, Mar. 22, 1960, 10,070/60
15 Claims. (Cl. 260—78.5)

This invention relates to improvements in additive compositions for lubricating oils and to lubricating compositions containing the improved additives.

This case is a continuation-in-part of U.S. patent application Ser. No. 96,073, filed Mar. 16, 1961, and abandoned subsequent to the filing of the present application.

Additive compositions have been employed for some years to improve properties of lubricating oils, for instance to raise the viscosity index of the oils, to depress their pour points and to improve their sludge dispersion properties. It is difficult to produce a multipurpose additive composition that satisfactorily combines all the advantages sought and, at the same time, can be produced at an economic price.

The present invention is concerned particularly with fumarate ester type additive compositions; such compositions are described in the specifications of British Patents Nos. 808,665 and 838,235. It has been found that, if the average length of the alkyl side chain of the fumarate esters is too short, the additives produced from them will be insufficiently soluble in the lubricating oils to which they are to be added and, if the average chain length is too long, the additive will be likely to crystallize out at low temperatures. For this reason it has been proposed to utilize mixed dicarboxylic acid esters, e.g. fumarate esters, having alkyl side chains of different lengths and selected to have an average length calculated to produce additives that are substantially soluble in the treated lubricating oils. With this in view it has been proposed, in the manufacture of additive compositions based on alkyl fumarates, to esterify fumaric acid with a mixture of alcohols obtained by the hydrogenation of coconut oil derivatives, which mixture contains alcohols of chain lengths from $C_8$ to $C_{18}$. However, it has been found that this blend contains more of the longer chain alcohols than is required for the preparation of satisfactory additives so that either the excess of higher alcohols must be discarded, thus constituting an economic loss in the manufacture of the additives; or lower alcohols, for example, propyl, butyl or hexyl alcohol, must be added to produce the desired average alkyl chain length of the mixture. In the latter case, however, the additives produced do not have the combination of properties hereinbefore mentioned in the desired degree.

The present invention makes it possible to utilize a mixture of alcohols conveniently, although not necessarily, derived from coconut oil, in an economically advantageous manner to produce additive compositions having the desired characteristics in a high degree.

The additives of the present invention comprise an oil-soluble copolymer prepared by copolymerizing (1) 35 to 75 parts by weight of a mixture of unsaturated dicarboxylic acid esters, e.g., dialkyl fumarates, (2) 10 to 40 parts by weight of a vinyl compound, (3) 2 to 10 parts by weight of a copolymerizable ester compound containing one or more ether linkages, and (4) 1 to 10 parts by weight of an N-vinyl substituted cyclic imide. The preferred ranges will be 50 to 70 parts by weight of the dicarboxylic acid ester mixture, 15 to 35 parts by weight of the vinyl compound, 3 to 8 parts by weight of the ester compound containing ether linkages, and 2 to 8 parts by weight of the cyclic imide.

The esters of said mixture of dicarboxylic acid esters suitable for use in the present invention will have alkyl side chain lengths within the range of 8 to 18 carbon atoms. They may readily be prepared by reacting 2 mols of a $C_8$ to $C_{18}$ saturated alcohol with 1 mol of an unsaturated dicarboxylic acid having 2 to 10 carbon atoms per molecule. Preferred acids are fumaric and maleic acid. As previously mentioned, a convenient mode of preparation of, for example, a mixture of $C_8$ to $C_{18}$ alkyl fumarates, is via the reaction between fumaric acid and the saturated alcohols resulting from the hydrogenation of coconut oil.

As hereinafter to be described, the mixed fully-esterified dicarboxylic acid esters, e.g. dialkyl fumarates, are copolymerized with the vinyl compound, the copolymerizable ester containing ether linkages, and the N-vinyl substituted cyclic imide, in the presence of a catalyst, at a suitable reaction temperature and pressure.

Amongst the vinyl compounds that may be employed to form the copolymers are the vinyl esters of saturated monocarboxylic acids, for example, vinyl acetate; vinyl halides, for example, vinyl chloride; vinyl ethers, for example, vinyl methyl ether; vinyl ketones, for example, methyl vinyl ketone; or vinyl aryl compounds, for example, styrene. Preferred vinyl compounds are those esters of unsaturated alcohols and saturated monocarboxylic acids having the general formula:

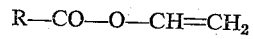
R—CO—O—CH=CH₂ wherein R is an alkyl group containing about 1 to 20 carbon atoms, preferably 1 to 7 carbon atoms. Vinyl acetate is a particularly preferred vinyl ester.

The copolymerizable esters containing one or more ether linkages may be represented by the general formula:

R(OR')ₙOXO(R'O)ₙR where R is a $C_1$ to $C_6$ alkyl radical; R' is a $C_1$ to $C_3$ alkylene radical, e.g. methylene, ethylene, propylene; $n$ is an integer from 1 to 3; and X is an alpha-beta-unsaturated dicarboxylic acid radical, e.g. a fumaric or maleic acid radical. Examples within this class are 2-ethoxy-ethyl fumarate, 2-ethoxy(2-ethoxy)ethyl fumarate, 2-butoxy-ethyl fumarate, etc.

The N-vinyl substituted cyclic imides used in the present invention are those cyclic compounds in which the imido group forms part of the ring as in a pyrrolidone. A compound such as benzamide would not be considered to be a cyclic imide. The preferred cyclic imides are those in which the imido group is contained in a 5 or 6 member ring, which ring may be fused to another ring system. The N-vinyl substituted cyclic imides can be substituted with alkyl groups containing from 1 to 16 carbon atoms, e.g. 1 to 6 carbon atoms. N-vinyl butyrolactam is an example of the preferred N-vinyl imides useful in the present invention. N-vinyl butyrolactam is represented by the following general formula:

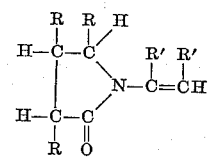

wherein R and R' are selected from the group consisting of hydrogen and $C_1$ to $C_{12}$ alkyl groups, and at least one of the R groups being hydrogen. A particularly preferred cyclic imide derivative is N-vinyl pyrrolidone, i.e. wherein all R and R' groups in the general formula described above are hydrogen.

Pyrrolidone may be obtained from butyrolactone by reaction with ammonia at elevated temperatures. A mixture of the pyrrolidone thus obtained and potassium hydroxide can then be vinylated with acetylene at elevated pressures to give N-vinyl pyrrolidone. The butyrolactone is obtained as a byproduct of wood carbonization.

The polymeric additives of this invention are prepared by the use of conventional polymerization catalysts, such as the peroxide type catalyst. These catalysts under reaction conditions decompose, giving free radicals which initiate the chain polymerization reaction. Examples of suitable catalysts which satisfactorily initiate the polymerization are tertiary-butyl hydroperoxide, 2,2,bis (tertiary-butyl-peroxy) butane, dietertiary-butyl peroxide, and dicumyl peroxide. A particularly preferred catalyst is tertiary butyl perbenzoate. Additionally, the rate of decomposition and effectiveness of the catalyst may be increased by certain activators such as benzoin, aryl sulfuric acid, and oil-soluble metal compounds such as iron stearate or naphthenate.

The concentrations for the catalyst are in the range of 0.1 to 3.0% by weight based on the total weight of the monomer mixture. Preferably the concentration should be in the range of 0.2 to 1.5% by weight. The catalyst may be added directly to the reactants in the form of a solution or slurry.

The polymerization is preferably carried out by mixing the reactants and catalyst in an inert atmosphere, for example nitrogen, at either atmospheric or increased pressure. The reaction mixture is then heated to a temperature below degradation, e.g. 200° C. and preferably at temperatures within the range of 50° to 100° C. As the polymerization reaction proceeds, the reaction mixture will thicken. The degree of completion of the reaction may be followed by means of viscosity measurements. It is advisable to add a diluent such as white oil, etc. to prevent the reaction mixture from becoming so thick that it can no longer be efficiently mixed or stirred. The diluent is preferably added in sufficient quantities that, by completion of polymerization, an additive concentrate containing between 25 and 65% by weight of the polymeric additive in oil is obtained. It is also preferred to conduct the reaction with an excess of the vinyl compound followed by removal of the excess of the vinyl compound after reaction, as by heating under reduced pressure. However, although an increase in the amount of the vinyl compound improves the viscosity index, there is a reduction of the shear breakdown point and a raising of the pour point if too much vinyl compound is employed. Furthermore, the addition of too great an excess of the vinyl compound decreases the oil solubility of the resulting additive compound. The amount of vinyl compound based on the total amount of monomers, therefore, should not exceed 40% by weight; on the other hand, it should not be less than 25% by weight, with the preferred range being 25 to 35 wt. percent.

Additionally, in preparing the polymeric additives of the invention, there is an upper optimum proportion of the particular ester containing ether linkages selected beyond which the polymer tends to become insoluble in the oil to which it is added. Moreover, below certain limits, there is a deterioration in the viscosity index and pour point depressant properties of the polymer. For example, when using 2-ethoxy ethyl fumarate as the ester containing ether linkages with the fumarates derived from mixed coconut oil alcohols, the optimum percentage of 2-ethoxy ethyl fumarate is in the region of 11 wt. percent of the total fumarate content. It is to be understood that this proportion will vary when using other ether alcohols or when alcohols other than mixed coconut oil derived alcohols are used; as the molecular weight of the ether alcohol increases, or its polarity (percent of oxygen in the molecule) decreases, the amount of the ether alcohol required for optimum performance of the additive produced will be increased.

The lubricant compositions of the present invention include the oil concentrates resulting from the polymerization process as described above. These concentrates can be further diluted with lubricating oils to form final compositions. Thus, the compositions of the present invention may consist of oil concentrates containing from 25 to 65% by weight of the polymeric additive as well as lubricating oil compositions containing 0.25 to 25% by weight, preferably about 1 to 15% by weight, of the polymeric additive. The polymer may also be incorporated in heating oils such as gas oils or other middle distillates to give compositions according to the present invention. Generally smaller proportions are required when used in heating fuels. For example, from about 0.005 to 2% by weight and preferably from about 0.01 to 0.5% by weight of the polymer, based on the total weight of the heating oil, will be used to improve the sludge inhibiting and low temperature properties of the heating oil.

The polymer is particularly effective as an additive for mineral lubricating oils but may be used with other oils such as those oils derived from animal or vegetable sources. Especially useful synthetic lubricating oil compositions are derived from complex esters, diesters, and mixtures thereof containing minor amounts of the polymeric additives of this invention.

The oil compositions of the present invention may also include conventional fuel or lubricating oil additives such as oil-soluble sulfonates, metal salt of alkyl phenol sulfides, pour depressants, extreme pressure additives, antiwear and antioxidant additives, etc.

The invention may be further understood by the following examples.

*Example 1.—Preparation of additive*

A mixture comprising by weight:
  67.8 parts of $C_8$ to $C_{18}$ alkyl fumarates (coconut alcohol fumarates)
  7.2 parts of 2-ethoxy ethyl fumarate
  30.0 parts of vinyl acetate, and
  5.0 parts of N-vinyl pyrrolidone was polymerized at reflux temperature, i.e. about 70° C., with 0.4 part of tertiary-butyl perbenzoate catalyst in the presence of 18.4 parts of technical white oil and then cut back with 100 parts of a mineral lubricating oil having a viscosity of 5.26 centistokes at 210° F., a viscosity index (V.I.) of 115 and a pour point of +10° F. Upon completion of the reaction, 15 parts by weight of unreacted vinyl acetate was removed by heating for two hours at 90° F. under a pressure of 1.5 mm Hg. The resulting product was a viscous, slightly hazy, yellowish additive material having a viscosity of 35,680 centistokes at 100° F. and of 2,878.5 centistokes at 210° F.

*Example 2.—Lubricating compositions*

*Part A.*—The additive material of Example 1 was dissolved in additional mineral lubricating oil, of the kind used in Example 1 for cutting back, in the following proportions by weight:

|  | Percent |
| --- | --- |
| Additive polymer | 10 |
| Lubricating oil | 90 |

The resulting lubricating oil composition had the following characteristics:

| | |
| --- | --- |
| Viscosity at 100° F., centistokes | 81.4 |
| Viscosity at 210° F., centistokes | 16.6 |
| V.I. (Dean and Davis) | 151 |
| Pour Point, ° F. | −5 |

*Part B.*—The additive material of Example 1 was dissolved in additional mineral lubricating oil, of the kind used in Example 1 for cutting back, in the following proportions by weight:

|  | Percent |
| --- | --- |
| Additive polymer | 6 |
| Lubricating oil | 94 |

The resulting lubricating oil composition had the following characteristics:

| | |
|---|---|
| Viscosity at 100° F., centistokes | 54.5 |
| Viscosity at 210° F., centistokes | 10.34 |
| V.I. (Dean and Davis) | 150 |
| Pour Point, ° F. | −10 |
| Sludge Dispersion, percent | 60 |

Sludge dispersion was assessed by the following method, using a standard used oil sludge obtainable from Pontiac Testing Laboratory under the description of "Standardized Oil Filter Test Contaminant No. I." 90 grams of the sample to be tested for sludge dispersion was thoroughly mixed with 10 grams of the standard sludge solution and allowed to stand for 24 hours at 200° F. At the end of this period the upper 25 mls. of the sample were drawn off, transferred to a 100 ml. centrifuge tube, the volume made up to 100 mls. with n-heptane and the whole centrifuged for one hour at 1500 r.p.m. The volume of sludge in mls., after centrifuging, was noted as the percentage sludge dispersion.

*Example 3*

Examples of other typical additives and lubricating compositions prepared by the procedures of Examples 1 and 2 and their properties, are shown in the following tables.

TABLE I.—PREPARATIONS OF ADDITIVES

COMPOSITION A. TOTAL FUMARATE:VINYL ACETATE:N-VINYL PYRROLIDONE=75:30:5 (BY WEIGHT)

[The wt. percent composition of the "total fumarate" was as follows]

| | Preparation No. | | | | |
|---|---|---|---|---|---|
| | 1 | 2 | 3 | 4 | 5 |
| $C_8$ to $C_{18}$ coconut alcohol fumarates | 89.1 | 89.6 | 90.4 | 91.2 | 91.7 |
| 2-ethoxy ethyl alcohol fumarate | 10.9 | 10.4 | 9.6 | 8.8 | 8.3 |

COMPOSITION B. TOTAL FUMARATE:VINYL ACETATE:2-N-VINYL PYRROLIDONE=70:35:5 (BY WEIGHT)

[The wt. percent composition of the "total fumarate" was as follows]

| | Preparation No. | | | | |
|---|---|---|---|---|---|
| | 6 | 7 | 8 | 9 | 10 |
| $C_8$ to $C_{18}$ coconut alcohol fumarates | 89.1 | 89.6 | 90.4 | 91.2 | 91.7 |
| 2-ethoxy ethyl alcohol fumarate | 10.9 | 10.4 | 9.6 | 8.8 | 8.3 |

The total monomer charge was 550 g. in each case.

*Example 4*

The following tables show the effect of reactant variables. Table III shows the effect upon viscosity index (V.I.) and pour point of varying the proportion of 2-ethoxy ethyl fumarate. Table IV shows how the percentage of ether alcohol required for optimum performance of the produced additive rises with increasing molecular weight. Table V shows the effect of increasing the proportion of vinyl acetate.

TABLE III

Monomer Reactants:
75 parts total fumarate
30 parts vinyl acetate
5 parts N-vinyl pyrrolidone

| Percent 2-ethoxy ethyl fumarate in total fumarate (coconut alcohol fumarate) | 2% polymer in base oil [1] | |
|---|---|---|
| | V.I. | Pour Point, ° F. |
| 0 | 138 | +20 |
| 8 | 143 | −15 |
| 9½ | 145 | −20 |
| 11 | 145 | −20 |
| 13 | Insoluble in oil at 0° F. | |
| 15 | Insoluble in oil at 60° F. | |

[1] The base oil was a mineral lubricating oil having a V.I. of 110 and a pour point of +20° F. All parts and percents are by weight.

TABLE IV

Monomer Reactants:
75 parts total fumarate
30 parts vinyl acetate
5 parts N-vinyl pyrrolidone

| Ether Alcohol | Percent Ether Alcohol Fumarate in Total Fumarate | 2% Polymer in Base Oil [1] | |
|---|---|---|---|
| | | V.I. | Pour Point, ° F. |
| 2-ethoxy-ethyl alcohol ($C_2H_5OC_2H_4OH$) (sold under the R.T.M. "Cellosolve") | 11 | 145 | −20 |
| 2-ethyoxy(2-ethoxy)ethyl alcohol ($C_2H_5OC_2H_4OC_2H_4OH$) (sold under the the R.T.M. "Carbitol") | 22 | 144 | −20 |
| 2-butoxy-ethyl alcohol ($C_4H_9OC_2H_4OH$) | 22 | 145 | −20 |
| $C_2H_5OC_3H_6OH$ | 15 | 144 | −20 |

[1] The base oil was a mineral lubricating oil having a V.I. of 110 and a pour point of +20° F. All parts and percents are by weight.

TABLE II.—PROPERTIES

| Preparation No.[1] | 1 | 2 | 3 | 4 | 5 | 6 | 7 | 8 | 9 | 10 |
|---|---|---|---|---|---|---|---|---|---|---|
| Polymer Concentrate: | | | | | | | | | | |
| Visc., cs. at 100° F | 1,965 | 3,280 | 8,480 | 1,915 | 3,090 | 7,350 | 4,500 | 3,660 | 4,500 | 4,800 |
| Visc., cs. at 210° F | 266 | 389 | 732 | 259 | 418 | 874 | 604 | 494 | 591 | 659 |
| 2 wt. percent blend of polymer concentrate in lubricating oil: | | | | | | | | | | |
| Visc., cs. at 100° F | 34.11 | 35.15 | 35.91 | 37.5 | 35.92 | 37.09 | 36.31 | 36.24 | 36.63 | 37.48 |
| Visc., cs. at 210° F | 6.04 | 6.15 | 6.27 | 6.43 | 6.32 | 6.74 | 6.44 | 6.45 | 6.43 | 6.64 |
| V.I. | 132 | 131 | 131 | 129 | 133 | 140 | 135 | 135 | 133 | 136 |
| Pour Point, ° F | −20 | 0 | 0 | −25 | −5 | −10 | −5 | −5 | −15 | −15 |
| 6 wt. percent blend of polymer concentrate in lubricating oil: | | | | | | | | | | |
| Visc., cs. at 100° F | 41.74 | 47.58 | 52.3 | 47.6 | 48.60 | 50.7 | 50.4 | 48.87 | 51.09 | 51.38 |
| Visc., cs. at 210° F | 7.70 | 8.56 | 9.57 | 8.32 | 8.85 | 9.70 | 9.61 | 9.12 | 9.58 | 10.02 |
| V.I. | 145 | 144 | 147 | 142 | 146 | 150 | 150 | 148 | 149 | 152 |
| Pour Point, ° F | −25 | −5 | −15 | −25 | −20 | −15 | −15 | −15 | −20 | −15 |
| Sludge Dispersance, percent | 75 | 70 | 55 | 60 | 40 | 75 | 70 | 70 | 60 | 55 |
| 10 wt. percent blend of polymer concentrate in lubricating oil: | | | | | | | | | | |
| Visc., cs. at 100° F | 52.7 | 62.5 | 66.7 | 60.0 | 64.4 | 72.0 | 67.7 | 65.3 | 70.0 | 71.62 |
| Visc., cs. at 210° F | 10.07 | 11.79 | 12.56 | 10.75 | 11.93 | 14.29 | 13.36 | 12.70 | 13.48 | 13.76 |
| V.I | 150 | 150 | 150 | 146 | 151 | 151 | 152 | 151 | 151 | 150 |
| Pour Point, ° F | −25 | −20 | −20 | −20 | −25 | −20 | −15 | −20 | −20 | −15 |

[1] See Table I.

TABLE V

| Total[1] Fumarate | Vinyl Acetate | N-vinyl Pyrrolidone | Polymer Shear Breakdown, Percent | 2% Polymer in Base Oil[2] | |
|---|---|---|---|---|---|
| | | | | V.I. | Pour Point, °F. |
| 75 | 30 | 5 | 27 | 145 | −20 |
| 70 | 35 | 5 | 40 | 151 | −20 |
| 65 | 40 | 5 | 50 | 154 | −10 |
| 60 | 45 | 5 | Insoluble in oil at 60° F. | | |

[1] Total fumarate contains 11% 2-ethoxy ethyl fumarate and 89% coconut oil fumarate.
[2] Base oil was a mineral lubricating oil having a V.I. of 110 and a pour point of +20° F. All parts and percents are by weight.

The advantages of the polymeric additives of the invention are readily apparent from the above examples. As indicated, lubricating oil compositions containing the additives of the invention exhibit superior viscosity index, pour point and sludge dispersant properties. Moreover, the additives can be conveniently prepared by using a mixture of dicarboxylic acid esters, e.g. alkyl fumarates, having $C_8$ to $C_{18}$ side chains, without the necessity of adjusting the average alkyl side chain length of the mixture to a specific desired value.

It is to be understood that the above examples have been given for illustrative purposes only and are not to be construed as limiting the invention.

What is claimed is:

1. An oil-soluble copolymer of (1) 35 to 75 parts by weight of a mixture of fumaric acid esters having $C_8$ to $C_{18}$ alkyl side chains, (2) 10 to 40 parts by weight of a vinyl ester of a saturated monocarboxylic acid, (3) 2 to 10 parts by weight of an ether ester having the general formula:

$$R(OR')_nOXO(R'O)_nR$$

wherein R is a $C_1$ to $C_6$ alkyl radical, R' is a $C_1$ to $C_3$ alkylene radical, $n$ is an integer from 1 to 3, and X is an alpha-beta-unsaturated dicarboxylic acid radical and (4) 1 to 10 parts by weight of an N-vinyl substituted cyclic imide, the chain length distribution of the alkyl groups in the said mixture of fumaric acid esters being essentially the same as the chain length distribution of the alkyl groups in coconut oil.

2. A copolymer according to claim 1, wherein said vinyl ester is vinyl acetate.

3. A copolymer according to claim 1, wherein said ether ester is 2-ethoxy ethyl fumarate.

4. A copolymer according to claim 1, wherein said ether ester is 2-ethoxy(2-ethoxy)ethyl fumarate.

5. A copolymer according to claim 1, wherein said ether ester is 2-butoxy-ethyl fumarate.

6. A copolymer according to claim 1, wherein said N-vinyl substituted cyclic imide has the general formula:

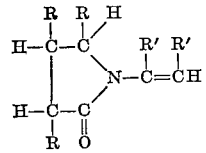

wherein R and R' are selected from the group consisting of hydrogen and $C_1$ to $C_{12}$ alkyl groups and at least one of the R groups is hydrogen.

7. A copolymer according to claim 1, wherein said N-vinyl substituted cyclic imide is N-vinyl pyrrolidone.

8. A method of preparing an oil-soluble polymeric lubricating oil additive which comprises polymerizing (1) 50 to 70 parts by weight of a mixture of fumaric acid esters having $C_8$ to $C_{18}$ alkyl side chains, (2) 15 to 35 parts by weight of a vinyl ester of a saturated monocarboxylic acid, (3) 3 to 8 parts by weight of an ether ester having the general formula:

$$R(OR')_nOXO(R'O)_nR$$

wherein R is a $C_1$ to $C_6$ alkyl radical, R' is a $C_1$ to $C_3$ alkylene radical, $n$ is an integer from 1 to 3, and X is an alpha-beta-unsaturated dicarboxylic acid radical and (4) 2 to 8 parts by weight of an N-vinyl substituted cyclic imide, wherein the polymerization is carried out at a temperature above 50° C. in the presence of 0.1 to 3.0 weight percent of a peroxide catalyst, the chain length distribution of the alkyl groups in the said mixture of fumaric esters being essentially the same as the chain length distribution of the alkyl groups in coconut oil.

9. A method according to claim 8, wherein said catalyst is tertiary butyl perbenzoate.

10. A method according to claim 8, wherein said vinyl ester is vinyl acetate.

11. A method according to claim 8, wherein said N-vinyl substituted cyclic imide is N-vinyl pyrrolidone.

12. A method according to claim 8, wherein said ester containing ether linkages is 2-ethoxy-ethyl fumarate.

13. A method according to claim 8, wherein said ester containing ether linkages is 2-ethoxy(2-ethoxy)ethyl fumarate.

14. A method according to claim 8, wherein said ester containing ether linkages is 2-butoxy-ethyl fumarate.

15. The oil-soluble copolymer of about 5 parts by weight of N-vinyl pyrrolidone, about 30 to about 40 parts by weight of vinyl acetate, and from about 65 to about 75 parts by weight of mixed esters of fumaric acid, wherein from about 8 to about 22 percent of said fumarate esters are esters of $C_1$ to $C_6$-alkoxy, $C_1$ to $C_3$-alkyl alcohols and from about 78 to about 92 percent of said fumarate esters are esters of mixed $C_8$ to $C_{18}$ aliphatic alcohols, the chain length distribution of the alkyl groups of said last named esters being essentially the same as the chain length distribution of the alkyl groups in coconut oil.

References Cited

UNITED STATES PATENTS

| | | | |
|---|---|---|---|
| 2,570,861 | 10/1951 | Roedel | 260—78.5 X |
| 2,944,974 | 7/1960 | Lorensen et al. | 252—51.5 |
| 2,977,309 | 3/1961 | Godfrey et al. | 252—51.5 |
| 3,012,998 | 12/1961 | Wishman et al. | 260—80.5 |
| 3,052,659 | 9/1962 | Woodruff | 260—80.5 |
| 3,137,679 | 6/1964 | Agius et al. | 260—78.5 |
| 3,143,513 | 8/1964 | Day et al. | 260—80.5 X |

JOSEPH L. SCHOFER, *Primary Examiner.*

JAMES A. SEIDLECK, JULIUS GREENWALD,
*Examiners.*

W. HOOVER, P. C. BAKER, S. M. LEVIN,
*Assistant Examiners.*